UNITED STATES PATENT OFFICE.

WILLIAM W. BROWN AND MILTON C. REYNOLDS, OF CULBERTSON, NEBRASKA.

WELDING COMPOUND.

SPECIFICATION forming part of Letters Patent No. 444,044, dated January 6, 1891.

Application filed May 22, 1890. Serial No. 352,803. (No specimens.)

*To all whom it may concern:*

Be it known that we, WILLIAM W. BROWN and MILTON C. REYNOLDS, citizens of the United States, residing at Culbertson, in the county of Hitchcock and State of Nebraska, have invented certain new and useful Improvements in Welding Compounds and Methods of Making the Same; and we do hereby declare the following to be a full, clear, and exact description of the invention, such as will enable others skilled in the art to which it appertains to make and use the same.

Our invention relates to a new and improved compound for use in welding steel and other metals and to the manner of compounding the same; and it consists in the compound and the manner of forming it, hereinafter particularly described and claimed.

The compound is composed of borax, sixteen (16) parts; muriate of ammonia, four (4) parts; yellow prussiate of potash, two and one-half ($2\frac{1}{2}$) parts, and pulverized soapstone, seven (7) parts.

The ingredients are compounded as follows: The borax, muriate of ammonia, and yellow prussiate of potash are pulverized and thoroughly mixed together, with sufficient soft water added to make a thin liquid. The mixture is then boiled down to the consistency of thick cream and allowed to cool. The compound is then pulverized and pulverized soapstone (seven parts) added thereto, and the whole thoroughly incorporated, when it is ready for use.

In using the compound the metal to be welded is heated to a red heat or red-hot. The compound is then applied to the heated metal and the metal returned to the fire and heated as before, after which it is taken out and the metals to be welded placed together on a hard base and hammered well together until the weld is completed. The hotter the metal after applying the compound the better the weld.

There has been given the proportions which have been found to be the best for the purpose; but it is not intended to be restricted thereto when other proportions will give similar results.

Having described the invention and set forth its merits, what is claimed is—

1. The within welding compound, composed of borax, muriate of ammonia, yellow prussiate of potash, and soapstone, substantially in the proportions specified.

2. The method of forming the within compound, consisting in mixing together borax, muriate of ammonia, and yellow prussiate of potash with water sufficient to make a thin liquid, then boiling the mixture to the consistency of a thick cream, then cooling and pulverizing the compound, and then adding pulverized soapstone and incorporating it with the mixture, substantially as and for the purposes set forth.

In testimony whereof we affix our signatures in presence of two witnesses.

WILLIAM W. BROWN.
MILTON C. REYNOLDS.

Witnesses:
RICHARD W. MONTGOMERY,
GEORGE W. ASHBURN.